June 23, 1953 — D. L. BRACKETT — 2,643,159
GRAIN CONVEYER
Filed July 22, 1950
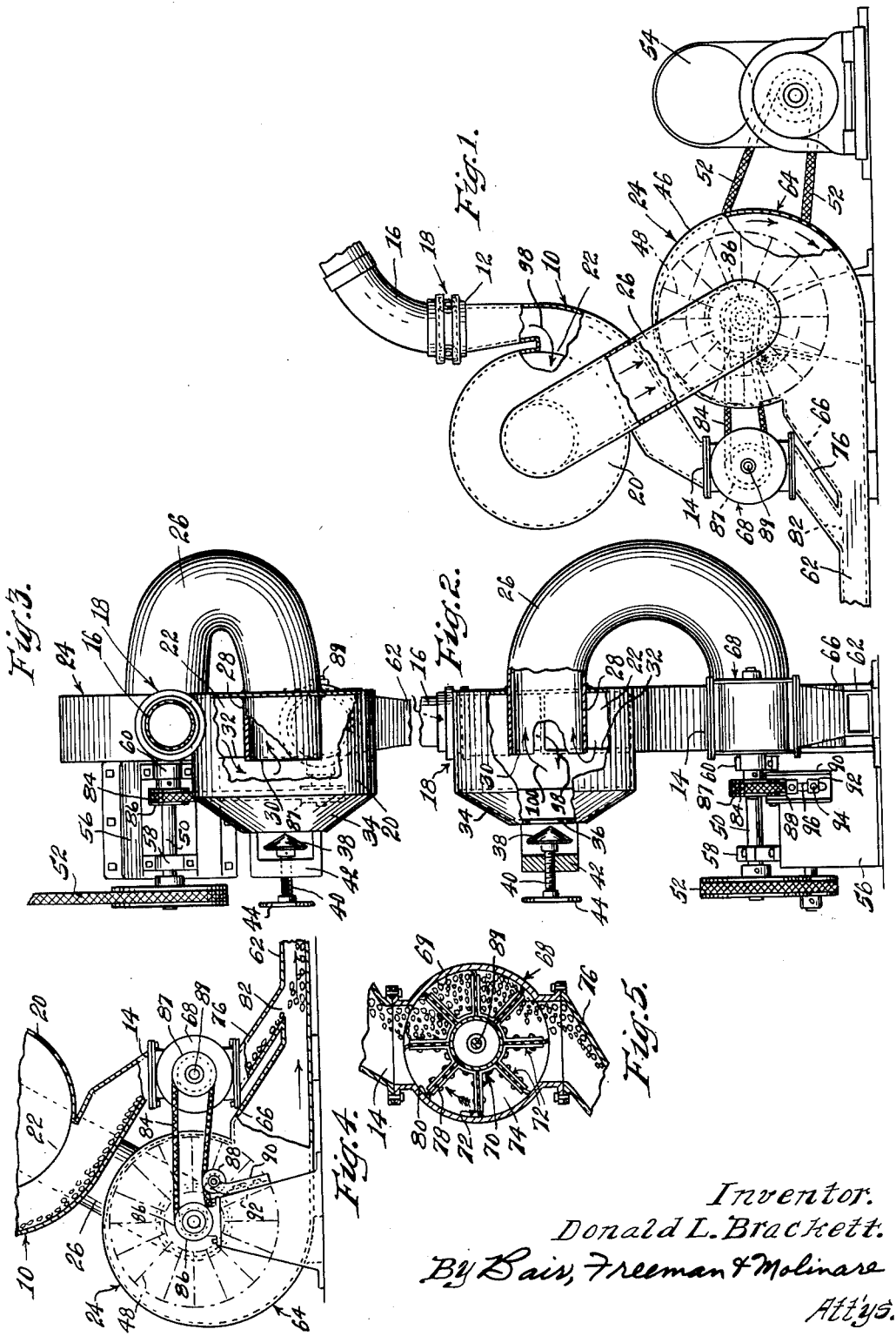
Inventor.
Donald L. Brackett.
By Bair, Freeman & Molinare
Att'ys.

Patented June 23, 1953

2,643,159

UNITED STATES PATENT OFFICE 2,643,159

GRAIN CONVEYER

Donald Leon Brackett, Waterloo, Iowa, assignor of two-thirds to General Sheet Metal Works, Waterloo, Iowa, a partnership Application July 22, 1950, Serial No. 175,358

8 Claims. (Cl. 302—23)

This invention relates to conveyors and more particularly to a pneumatic type conveyor for transferring pellet-like material such as grain or gravel.

The desirability of rapidly transferring large quantities of pellet-like material, particularly grain, from vehicles to bins, or vice versa, has posed many problems, the solution of which have been vigorously sought for many years. A mechanical conveyor system was too cumbersome and a pneumatic conveyor system was sought out. A suction system to pick up the grain and a blower system to throw out or feed the grain were the results of early attempts to provide an adequate machine.

It was appreciated at an early stage that it was undesirable to have the grain go through the fan or blower blades and attempts were made to by-pass the fan blades. This resulted in a system which consisted of a suction line for picking up the grain, a sealed separation chamber into which said suction line led, a feeder at the bottom of the separation chamber adapted to receive the grain, a suction line from the separation chamber to the fan, a blower line through which the fan discharged the air it was sucking, and a line from the feeder into the blower line for feeding the grain into the air stream for further conveyance.

There are a number of undesirable features in such an arrangement. For one, when the grain passes from the suction line to the separation chamber it is often brought to an abrupt halt within the chamber, as it hits a wall therein. This often results in cracking open the grain, which is undesirable for cracked grain spoils very rapidly.

Attempts have been made to bring the grain into the separation chamber tangentially, but in such machines, the grain is brought in horizontally and there is still the problem of coping with the vertical drop within the chamber. If the grain only fell upon other grain at the bottom of the separation chamber there would be little problem, but because the outlet from such separation chambers is much smaller than the chamber itself, necessarily a large part of the area upon which the grain falls is chamber wall and hence the problem of cracked grain within the separation chamber still persists.

It is understood that the separation chamber is much larger than the suction line because then the change in velocity of the air permits settling out of the air stream by the grain. If the air velocity drop in the separation chamber is too great, the grain undergoes a more abrupt change in velocity and cracking increases. If the air velocity drop is not too great then some of the grain will tend to accompany the air into the blower.

The entrance of grain into the blower is undesirable since the grain may be cracked by impinging against the impeller blades, or the blower may become plugged, which is a frequent occurrence today with pneumatic grain conveyors. The tearing down of a blower to clean it out after it becomes plugged is a very time consuming and uneconomical procedure.

On the other hand, if a screen is put in the air stream before the blower, then the screen often becomes clogged with grain with a corresponding pressure drop in the air stream and decrease in efficiency of the machine. Here too, the tearing down process to clean a clogged screen may be very costly.

Another problem that often arises is that too much grain per unit volume of air is drawn into the machine. When this occurs, there is an excess of grain and there is a greater chance of having some of it go through the blower impeller. Further, because of losses in the system, there is often not enough air being discharged from the blower to carry all the grain with it, and as a result clogging takes place. The amount of grain picked up by the inlet tube is a function of the grain's size and weight, and also a function of the way the inlet tube is handled by its operator.

Thus, one of the objects of this invention is to provide a pneumatic grain conveyor, which by means of a novel structural arrangement, provides for improved separation of the grain from the air.

Another object of this invention is to provide a pneumatic grain conveyor in which the problems of clogging of the blower or of a screen are obviated.

A further object of this invention is to provide a novel separation device for a pneumatic grain conveyor whereby cracking of the grain by reason of the grain striking hard portions of the machine is substantially eliminated.

Still another object of this invention is to provide a pneumatic grain conveyor provided with means for varying the rate at which the mixture of grain and air is picked up.

Still a further object of this invention is to provide a pneumatic grain conveyor provided with means for controlling the amount of grain that passes through the conveyor per unit volume of air that is discharged therefrom.

And still a further object of this invention is to provide a pneumatic grain conveyor provided with a supplemental air system and with means for varying the amount of supplemental air supplied.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a side elevational view with portions broken away of my grain conveyor showing the novel structural arrangement of the elements of the conveyor;

Figure 2 is an elevational view partly in cross section, and with portions broken away to show the supplemental air system, of the grain conveyor shown in Figure 1, and is taken looking from the left of Figure 1;

Figure 3 is a top plan view of the grain conveyor and is taken looking downwardly on Figure 2;

Figure 4 is a view of the blower and feeder portion of the grain conveyor taken looking from the left of Figure 2; and Figure 5 is an enlarged cross sectional view of the feeder.

Referring to Figure 1 there is shown a substantially upright feeding tube generally indicated at 10 having its inlet end 12 located at the upper end thereof and its outlet end 14 located at its lower end thereof. The inlet end 12 of feeding tube 10 is circular in cross section. A suction inlet tube 16 is connected to the inlet end 12 of feeding tube 10. This suction inlet tube may have flexible portions which adapt the inlet tube 16 to be manually manipulated by an operator to pick up the grain that is to be conveyed. The connection 18 between feeding tube 10 and suction inlet tube 16 permits rotation of suction inlet tube 16 relative to feeding tube 10 whereby the suction inlet tube may be rotated to a desired position. The suction inlet tube 16 and rotatable connection 18 are well known constructions and are not part of the invention herein.

A cylindrical separation chamber 20 is mounted adjacent the feeding tube 10 along a region intermediate the ends 12 and 14 of the feeding tube 10. The feeding tube 10 is curved so that a portion of the length of feeding tube 10 lies adjacent the cylindrical wall of the separation chamber 20. The wall of feeding tube 10 and the wall of separation chamber 20 which are adjacent each other are cut away so as to form a common opening 22 therebetween. As can best be seen in Figures 2 and 3, the width of feeding tube 10 is smaller than the width of cylindrical separation chamber 20. Thus, the limiting width dimension of the opening 22 between the feeding tube 10 and the cylindrical separation chamber 20 is the width of the feeding tube 10. The feeding tube 10 and the cylindrical separation chamber 20 lie adjacent each other over approximately an arc of 90° and hence the greatest length of the common opening 22 between feeding tube 10 and separation chamber 20 is approximately one-quarter of the circumference of the cylindrical separation chamber 20.

The feeding tube 10 has a cylindrical cross section at its upper end 12 thereof because it is simple to adapt a circular cross section to the normal circular cross section of the suction inlet tube 16. However, the portion of the feeding tube which lies adjacent the separation chamber 20 is rectangular in cross section, thus providing a flat surface adjacent which is mounted the cylindrical separation chamber. The quadrant of the cylindrical separation chamber 20 which is open to the feeding tube 10 lies in the lower semi-circular portion of the cylindrical cross section of separation chamber 20.

A blower generally indicated at 24 is connected to the separation chamber 20 by means of an elbow section 26. This elbow section 26 is a suction line through which air is drawn by the blower from the separation chamber 20. A portion 28 of suction elbow 26 extends concentrically within separation chamber 20. This portion 28 of suction tube 26 extends across and beyond the width of the common opening 22 between the feeding tube 10 and the separation chamber 20. This can best be seen by reference to Figures 2 and 3 where the extended end of the suction tube 26 is indicated at 30 and the border of the common opening 22 is indicated by dotted line 32.

The side 34 of separation chamber 20 located opposite the open end of suction tube 26 has a supplemental air port 36 provided therein. The amount of air that enters separation chamber 20 through supplemental air port 36 is governed by a valve 38 which is adapted to move toward and away from the supplemental air port 36 so as to block or open the passage through said port 36.

The valve 38 is secured to a threaded stem 40, which stem is threaded into a yoke 42. A handle 44 is attached to the stem 40 to provide means for moving the valve 38 toward and away from the supplemental air port 36. This supplemental air port 36 is located at a point directly opposite the extended end 30 of suction tube 26.

The blower indicated at 24 includes a housing 46 and a multi-blade centrifugal type fan 48 mounted therein. The suction tube 26 is connected to the blower housing 46 at a point concentric with the axis of the fan 48. The fan 48 is mounted on a shaft 50 which shaft 50 is driven by means of belts 52 connected to an engine as indicated at 54. This engine 54 may be an electrical or a gasoline type engine. The shaft 50 is supported upon a pedestal type structure 56 by means of a pair of bearings 58 and 60.

Extending from the blower housing 46 is a discharge air tube 62 adapted to receive a tangential discharge of air from the centrifugal fan 48. The peripheral wall of blower housing 46 has a spiral type shape as indicated at 64 to provide a passageway of increasing size between the periphery of fan 48 and the peripheral spiral wall 64 of blower housing 46. This gradually enlarging passageway leads into discharge air tube 62 through a converging funnel-type shroud 66 connecting the blower housing 46 to the discharge air tube 62. The discharge air tube 62 is of such a cross sectional area that the velocity of the air passing therethrough is very high.

Referring back to the feeding tube 10, the lower end of the feeding tube 14 opens to a feeder 68 through which the separated grain passes. The feeder 68, as shown most clearly in Figure 5, comprises a cylindrical housing 69 in which a rotor 70 is concentrically mounted. This rotor 70 includes a plurality of blades 72 which form therebetween pockets 74. The pockets 74 receive the separated grain from the lower end 14 of the feeding tube 10. The grain is then discharged at the lower end of the feeder 68 into a discharge grain tube 76.

The blades 72 of the rotor 70 comprise a pair of metal members 78 which have clamped therebetween a rubber strip 80. The length of the metal members 78 are such that they just clear the inside periphery of cylindrical feeder housing 69. The length of the rubber strips 80, however, is such that the tips of rubber strips 80 are squeezed into contact against the inside periphery of feeder housing 69. The rubber strips 80 thus serve to seal the feeder 68 so that substantially no air passes from feeder tube 10 to discharge grain tube 76. Thus, effectively the rotor 70 is a device for picking up grain from the feeding tube 10 and discharging grain into the discharge grain tube 76 at the same time sealing the passage therethrough. This type of seal is known as a rotary seal.

The discharge grain tube 76 is funnel-shaped and opens into the discharge air tube 62 at 82 as shown in Figures 1 and 4. In this way the grain that passes through the feeder 68 is introduced into the discharge air stream passing through discharge tube 62. The discharge grain tube 76 is sloped so that the grain that is being fed into the discharge air tube 62 has an initial velocity in the direction of the movement of the air stream through tube 62. This provides for increased efficiency of the discharge air stream in transporting the grain from the machine.

The rotor 70 of the feeder 68 is driven by means of a belt 84 which passes over a pulley 86 mounted upon the fan shaft 50 and over another pulley 87 mounted on shaft 89 of feeder rotor 70. An idler wheel 88 is provided for taking up any slack in the belt 84. This idler wheel 88 is mounted upon a channel 90, which channel 90 is mounted upon one of the upright walls of pedestal 56. The channel 90 is adapted for substantially vertical adjustment upon pedestal 56 in a well known manner and by means of a pair of nuts 92, a pair of studs 94 secured to the pedestal 56, and a slotted hole 96 in the channel 90 through which the studs 94 protrude.

Operation

In the operation of the machine described above, the inlet end of the suction inlet tube is placed adjacent to or inserted within a mass of the grain that is to be conveyed. The suction that is produced by the fan 48 draws a mixture of grain and air through inlet tube 16 into the inlet end 12 of feeding tube 10. At the point of entrance of the grain to the inlet end 12 of feeding tube 10, the grain has a vertically downward velocity, under the force of gravity and the force of the suction air pressure.

As the mixture of air and grain passes through feeding tube 10, the air is sucked through common opening 22 into separation chamber 20. The separation chamber 20 being cylindrical, some of the air that is drawn in follows a circular path into the separation chamber 20. The feeding tube 10 lies tangentially adjacent the separation chamber 20 at the region where the air passes from the feeding tube 10 into the separation chamber 20. Although there is some force exerted upon the grain to draw the grain toward the separation chamber, the force of gravity tends to effectively separate the grain from the air.

The tangential running of feeding tube 10 adjacent to the separation chamber 20 provides for the most smooth manner of separating all the grain from the air, as even that grain which has a tendency to follow the air being separated will lie closer to the outer or bottom wall of feeding tube 10 than if the feeding tube 10 were disposed wholly vertically. This greatly reduces the amount of cracking open of grain that may occur by reason of the grain being drawn away from the wall of the feeding tube 10 and then upon separation from the air dropping a considerable distance against the metal wall.

Since the feeder 68 is substantially air tight, all the air that is drawn in through suction tube 16 must pass into separation chamber 20 to be exhausted. The tangential curve of the feeding tube 10 also provides a sloping surface upon which the separated grain tumbles downwardly into the feeder 68.

The separated air passes from feeding tube 10 into separation chamber 20 through the common opening 22 therebetween, as indicated by air flow arrow 98 shown in Figure 1. The separation chamber 20 is of much greater volume than is the feeding tube 10 and hence the velocity of the air in separation chamber 20 is much less. Thus if any grain does happen to pass into separation chamber 20 with the air, it is quickly separated out. It will be noted that the common opening between separation chamber 20 and feeding tube 10 is located in the lower semi-circular portion of the cylindrical cross section of separation chamber 20. This provides that any grain which is separated out within the separation chamber 20 will fall back through opening 22 into feeding tube 10 where it will be conveyed to the feeder 68.

The air that enters separation chamber is greatly slowed down as has been discussed above. To further provide a tortuous passage for any grain which accompanies the air, the portion 28 of suction elbow 26 through which the air is drawn extends across and beyond the width of the common opening 22 between the feeding tube 10 and the separation chamber 20. Thus any air which is brought into feeding tube 10 must make a turn as indicated by arrow 98 in order to get from the feeding tube 10 into the separation chamber 20, and then must make a second turn as indicated by arrow 100 in order to go from the separation chamber around the extended end 30 of suction tube 26 in order to enter the suction tube 26.

The amount of air that is drawn in with grain, may be regulated by the use of a supplemental air port 36 in separation chamber 20. If the fan 48 is drawing fixed amounts of air, the more air that is permitted to enter separation chamber 20 through supplemental air port 36, the less air will be drawn in through the inlet tube 16. This of course will regulate the amount of grain that is also drawn into inlet tube 16. Furthermore, the air that enters separation chamber 20 through air port 36 exercizes certain aerodynamic effects upon the air that is being drawn from inlet tube 10 into separation chamber 20 such that any tendency of the separated air to carry grain with it is greatly reduced. The amount of supplemental air that enters separation chamber 20 is controlled by valve 38.

The mixture of separated air and supplemental air then passes through suction elbow 26 into blower housing 46 where it is driven by fan 48 through the discharge air tube 62. The grain that passes through the feeder 68 is discharged into the discharge air tube 62 and is carried by the discharge air to the desired point. It will be noted that although the suction inlet pressure is varied by the use of the supplemental air port 36, the discharge air pressure of the blower is not materially affected thereby and the force, necessary to carry the grain the distances designed for in the blower 24, is not affected whatsoever.

Although my machine has been described primarily as a grain conveyor, it is obvious that a machine based upon the same principles described herein may be used for conveying other pellet-like material such as gravel, etc. and hence it is not intended that the use of my machine be limited solely to the principal and most obvious use set forth above.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A pneumatic grain conveyor comprising suction means for sucking up a mixture of grain and air, means including a separation chamber for separating the air from the grain, blower means for producing an air blast, whereby simultaneously said suction is produced, means for feeding the separated grain into the air blast, and means for introducing supplemental air into the air stream through the separation chamber.

2. A pneumatic grain conveyor comprising suction means for sucking up a mixture of grain and air, separator means including a separation chamber for separating the air from the grain, blower means for producing an air blast, whereby simultaneously said suction is produced, means for feeding the separated grain into the air blast, means for introducing supplemental air into the air stream through the separation chamber, and means for varying the amount of supplemental air being introduced.

3. A pneumatic grain conveyor comprising a feeding tube having an inlet and an outlet end, a feeder at the outlet end of said feeding tube, inlet means connected to the inlet end of said feeding tube adapted to convey a mixture of grain and air to the feeding tube, a separation chamber, said feeding tube along a region intermediate its ends lying adjacent to said separation chamber, said feeding tube and said separation chamber having a common opening therebetween at said region of adjacency, said feeding tube and said separation chamber cooperating to separate the grain from the air, a blower, a suction tube connecting the separation chamber to said blower, a feeder adapted to receive the separated grain, a discharge air tube from said blower, and a discharge grain tube connecting the feeder to the discharge air tube, whereby grain is fed into the air discharged from the blower, and means for introducing supplemental air into the separation chamber.

4. A pneumatic grain conveyor comprising a feeding tube having an inlet and an outlet end, a feeder at the outlet end of said feeding tube, inlet means connected to the inlet end of said feeding tube adapted to convey a mixture of grain and air to the feeding tube, a separation chamber, said feeding tube along a region intermediate its ends lying adjacent to said separation chamber, said feeding tube and said separation chamber having a common opening therebetween at said region of adjacency, said feeding tube and said separation chamber cooperating to separate the grain from the air, a blower, a suction tube connecting the separation chamber to said blower, said suction tube extending within the separation chamber, a feeder adapted to receive the separated grain, a discharge air tube from said blower, and a discharge grain tube connecting the feeder to the discharge air tube, whereby grain is fed into the air discharged from the blower, and means for introducing supplemental air into the separation chamber at a point opposite the extended end of said suction tube.

5. A pneumatic grain conveyor comprising a feeding tube having an inlet and an outlet end, a feeder at the outlet end of said feeding tube, inlet means connected to the inlet end of said feeding tube adapted to convey a mixture of grain and air to the feeding tube, a cylindrical separation chamber, said feeding tube along a region intermediate its ends lying adjacent to the cylindrical wall of said separation chamber, said feeding tube and said separation chamber having a common opening therebetween at the region of adjacency, said separation chamber being wider than said feeding tube, said common opening extending in length over approximately one-quarter of the circumference of said separation chamber and over the width of the feeding tube, a blower, a suction tube connecting the separation chamber to said blower, said suction tube extending concentrically within the separation chamber across and beyond the width of the common opening between the feeding tube and the separation chamber, and means for introducing supplemental air into the separation chamber at a point opposite the extended end of said suction tube.

6. A pneumatic grain conveyor comprising a feeding tube having an inlet and an outlet end, a feeder at the outlet end of said feeding tube, inlet means connected to the inlet end of said feeding tube adapted to convey a mixture of grain and air to the feeding tube, a cylindrical separation chamber, said feeding tube along a region intermediate its ends lying tangent to the cylindrical wall of said separation chamber, said feeding tube and said separation chamber having a common opening therebetween at the region of adjacency, said separation chamber being wider than said feeding tube, said common opening extending in length over approximately one-quarter of the circumference of said separation chamber and over the width of the feeding tube, said opening being located substantially below a horizontal geometrical plane through the center of said separation chamber, whereby grain that enters the separation chamber will fall through said opening back into the feeding tube, a blower, a suction tube connecting the separation chamber to said blower, said suction tube extending concentrically within the separation chamber across and beyond the width of the common opening between the feeding tube and the separation chamber, means for introducing supplemental air into the separation chamber at a point opposite the extended end of said suction tube.

7. A pneumatic grain conveyor comprising a substantially upright feeding tube, a feeder at the lower end of said feeding tube, a suction inlet tube connected to the upper end of said feeding tube, a cylindrical separation chamber, said feeding tube along a region intermediate its ends lying tangent to the cylindrical wall of said separation chamber, said feeding tube and said separation chamber having a common opening therebetween at the region of adjacency, said feeding tube and said separation chamber cooperating to separate the grain from the air, said common opening extending in length over approximately one-quarter of the circumference of said separation chamber and over the width of the feeding tube, a blower, a suction tube connecting the separation chamber to said blower, said suction tube opening to said separation chamber at right angles to the opening of said feeding tube to said separation chamber, whereby all air entering said separation chamber from said feeding tube must turn at least 90° after entering said separation chamber in order to enter said suction tube, a discharge air tube from said blower, a discharge grain tube connecting the feeder to the discharge air tube, whereby grain is fed into the air discharged from the blower, and means for introducing supplemental air into the separation chamber.

8. A pneumatic grain conveyor comprising a substantially upright feeding tube, a feeder at the lower end of said feeding tube, a suction inlet tube connected to the upper end of said feeding tube, a cylindrical separation chamber, said feeding tube along a region intermediate its ends lying tangent to the cylindrical wall of said separation chamber, said feeding tube and said separation chamber having a common opening therebetween at the region of adjacency, said feeding tube and said separation chamber cooperating to separate the grain from the air, said common opening extending in length over approximately one-quarter of the circumference of said separation chamber and over the width of the feeding tube, a blower, a suction tube connecting the separation chamber to said blower, said suction tube opening to said separation chamber at right angles to the opening of said feeding tube to said separation chamber, whereby all air entering said separation chamber from said feeding tube must turn at least 90° after entering said separation chamber in order to enter said suction tube, a discharge air tube from said blower, a discharge grain tube connecting the feeder to the discharge air tube, whereby grain is fed into the air discharged from the blower, means for introducing supplemental air into the separation chamber, and means for varying the amount of supplemental air being introduced.

DONALD LEON BRACKETT.

References Cited in the file of this patent

UNITED STATES PATENTS

| Number | Name | Date |
|---|---|---|
| 585,804 | Weber | July 6, 1897 |
| 636,670 | Jones | Nov. 7, 1899 |
| 1,173,073 | Williams | Feb. 22, 1916 |
| 1,605,196 | Ligon | Nov. 2, 1926 |
| 2,417,700 | McCarty | Mar. 18, 1947 |

FOREIGN PATENTS

| Number | Country | Date |
|---|---|---|
| 122,353 | Great Britain | Jan. 23, 1919 |